Feb. 22, 1938.  A. H. LYON  2,108,823
MACHINE TOOL
Filed Jan. 28, 1935  2 Sheets-Sheet 1
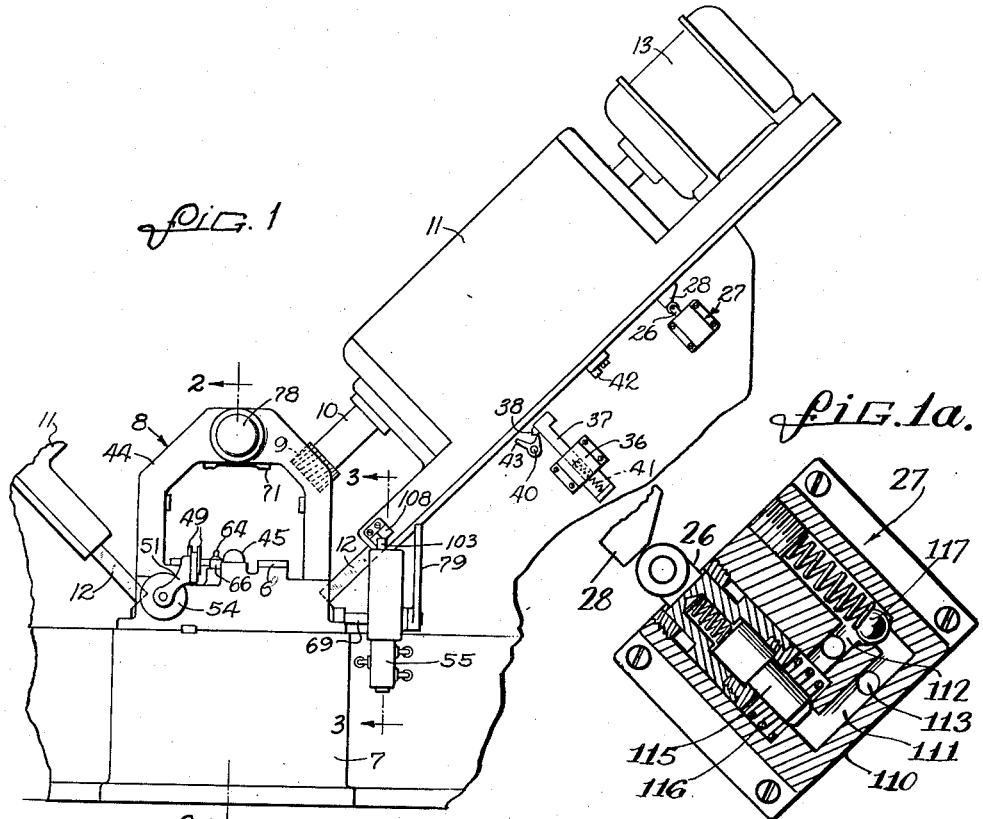
Fig. 1
Fig. 1a.
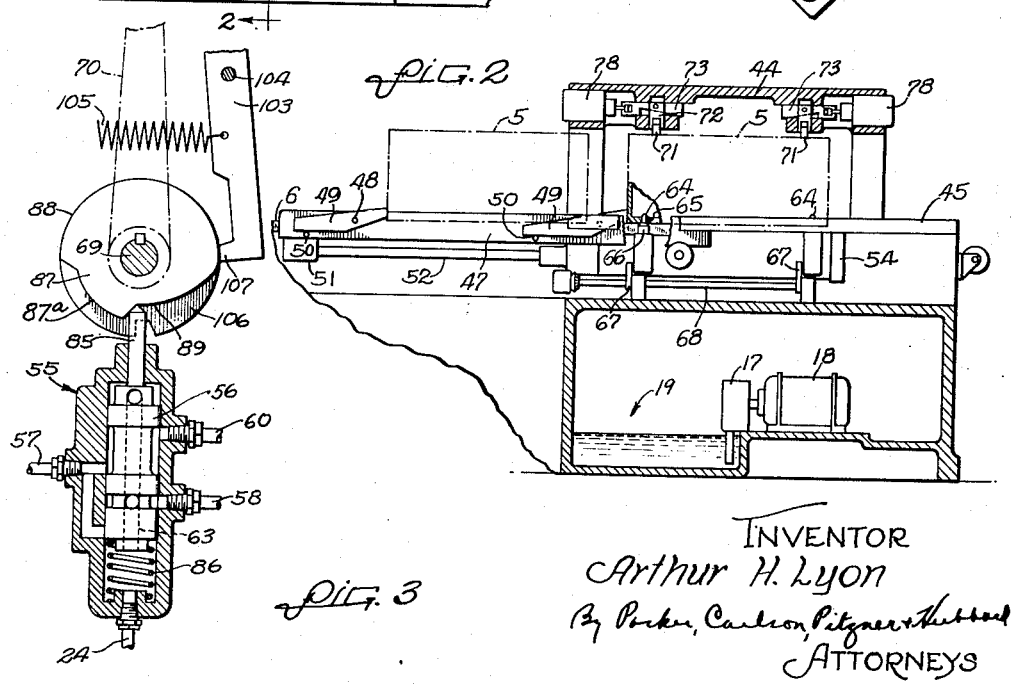
Fig. 2
Fig. 3
INVENTOR
Arthur H. Lyon
By Parker, Carlson, Pitzner & Hubbard
ATTORNEYS Feb. 22, 1938.  A. H. LYON  2,108,823
MACHINE TOOL
Filed Jan. 28, 1935   2 Sheets-Sheet 2

INVENTOR
Arthur H. Lyon
By Parker, Carlson, Pitzner & Hubbard
ATTORNEYS

Patented Feb. 22, 1938

2,108,823

UNITED STATES PATENT OFFICE 2,108,823

MACHINE TOOL

Arthur H. Lyon, Rockford, Ill., assignor to The Ingersoll Milling Machine Company, Rockford, Ill., a corporation of Illinois Application January 28, 1935, Serial No. 3,754

20 Claims. (Cl. 77—3)

This invention relates generally to automatic machine tools and more particularly to the intercontrol of the mechanisms which effect clamping of a work piece in operating position, relative movement between the work piece and a tool, and movement of successive work pieces into operating position.

The primary object of the present invention is to provide a new and improved mechanism for coordinating the operations of the mechanisms for performing the tool feeding, work clamping, and work conveying functions in a machine of the above character so as to provide for optimum safety in the operation of the machine, and to eliminate the danger of the work piece or the parts of the machine being damaged by operation of any of the mechanism at the wrong time.

A more detailed object of the invention is to provide a machine tool having a novel system for coordinating the operations of the work clamping and tool feeding mechanisms with a means to detect proper positioning of the work piece so as to prevent operation of either of these mechanisms with the work piece incorrectly positioned.

Another object is to provide a novel system for coordinating the operation of a work conveyor mechanism with the work positioning, work clamping, and tool feeding mechanisms so that operation of the conveyor mechanism cannot take place until the finished work piece is freed for movement out of operating position.

A further object is to interrelate the controls for the mechanisms above referred to so that all of these mechanisms may be operated in proper sequence by a single manually operable device.

Still another object is to provide in combination with means for accurately positioning a work piece a novel mechanism for disabling the tool feeding mechanism until a work piece has been moved into operative association with the positioning means.

The invention also resides in the novel character of the means by which intercontrol of the various functions is effected.

Other objects and advantages of the invention will become apparent from the following detailed description taken in connection with the accompanying drawings, in which Figure 1 is a fragmentary side elevational view of a boring machine embodying the novel features of the present invention.

Fig. 1ª is a fragmentary cross-sectional view through one of the valves shown in Fig. 1.

Fig. 2 is a fragmentary sectional view taken along the line 2—2 of Fig. 1.

Fig. 3 is a fragmentary sectional view taken along the line 3—3 of Fig. 1.

Figure 4:
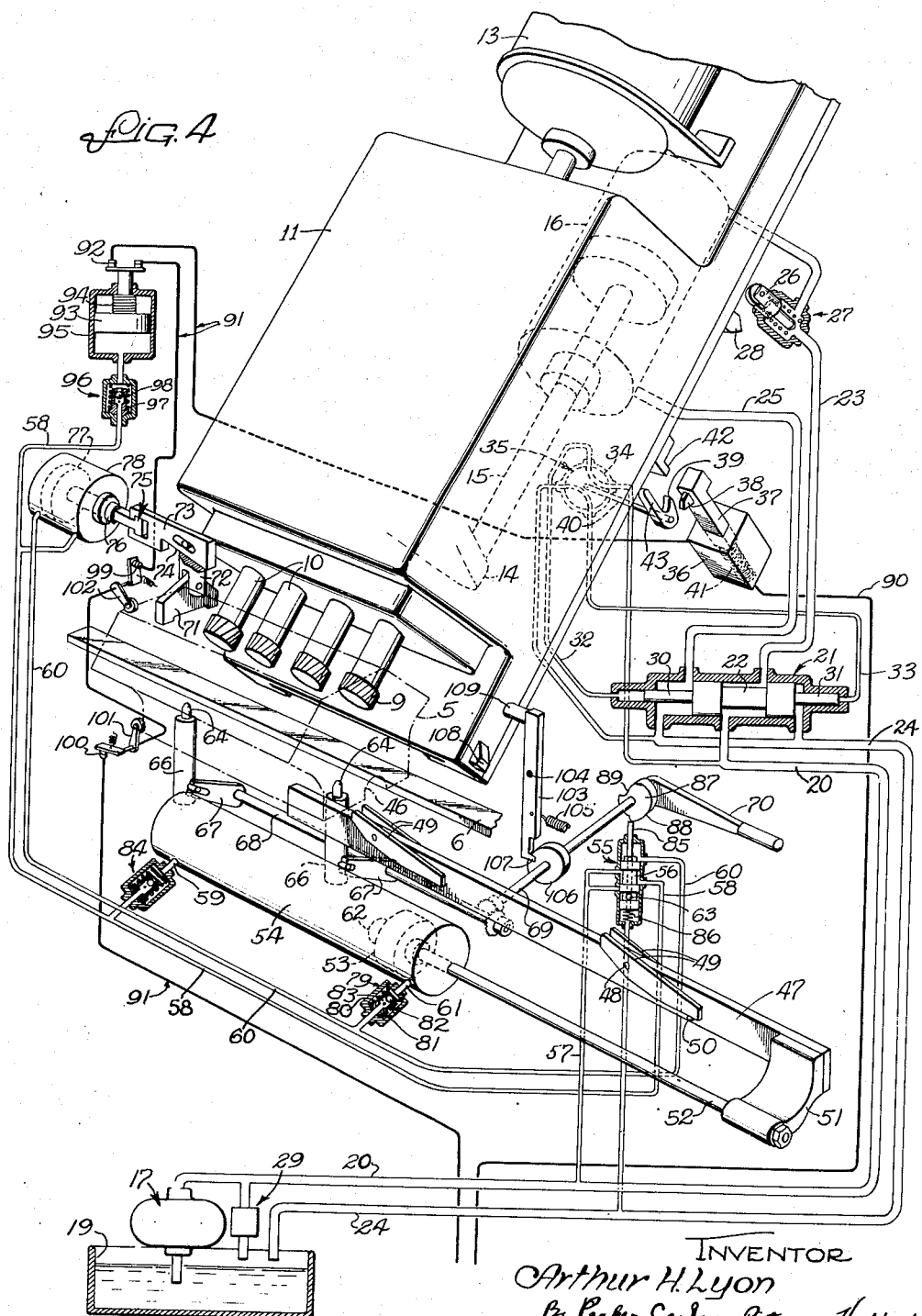
Fig. 4 is a fragmentary perspective view and circuit diagram.

Referring now to the embodiment selected for purposes of illustration, the numeral 5 indicates the engine block or work piece which during the machining operation is clamped in an upright position against skid plates 6 on the base 7 of a work support or fixture 8 mounted on the machine bed. The cylinders are bored by two sets of tools 9 fast on spindles (not shown) journaled in sleeves 10 which are rigid with heads 11 mounted to slide along inclined ways 12 toward and away from the block. Motors 13 on the heads operate through appropriate reduction gearing to rotate the tools.

While the invention is embodied for purposes of illustration in a machine for boring the cylinders in an engine block of the V-type, this is merely one type of machine tool in which the invention may be utilized. It is to be understood, therefore, that I do not intend by such disclosure to limit the invention in any way but aim to cover all modifications and alternative construction falling within the spirit and scope of the invention as expressed in the appended claims.

The invention is especially applicable to machine tools in which relative movement between the tool and work, clamping of the work, and advance of successive work pieces into operative position with respect to the tools are effected by power driven mechanisms. Generally stated, the invention contemplates a novel system of interrelating the controls for these mechanisms so that the work clamping and tool feeding mechanisms are disabled against effective operation until a work piece is accurately located in position for proper machining and that clamping of the work, disengagement of the work locating means, and full retraction of the tools from the work are conditions precedent to the operation of the conveying mechanism by which the finished work piece is moved out of the machine. The controls are so arranged that all of the operations thus interrelated may be governed from a single manually shiftable device or handle.

Herein the heads are actuated hydraulically and for this purpose are connected at 14 to the ends of piston rods 15 reciprocable in stationary cylinders 16 mounted in the machine frame beneath the heads. A constant discharge pump 17 driven by an electric motor 18 withdraws fluid from a sump 19 and delivers the fluid under pressure to a conduit 20 leading to a valve 21. The latter has a member 22 shiftable between two positions in one of which (see Fig. 4) the supply pipe 20 is connected to a pipe 23 leading to the rear end of the cylinder 16, and the drain or return pipe 24 is connected to a pipe 25 leading to the forward end of the cylinder. The plunger 26 of a spring opened valve 27 interposed in the pipe 23 is disposed in the path of a dog 28 on the head 11, the arrangement being such that when the head is fully retracted the valve 27 will be closed thereby closing the rear end of the cylinder against the further escape of fluid and terminating the return motion of the head with the tools retracted out of engagement with the work. To relieve the pressure which builds up as a result of continued operation of the pump, a spring loaded by-pass valve 29 communicates with the pipe 20 and diverts the fluid delivered by the pump back into the sump.

The valve 27 is of a construction well known in the art and as shown in Fig. 1a comprises a casing 110 having passages 111 and 112 communicating respectively through ports 113 and 114 with the pipe 23 and the extension thereof leading to the cylinder 16. These passages are connected at one end through a control valve including a member 115 carried by the plunger 26 and urged away from its seat by a spring 116. Communication between the other ends of the passages is through a check valve 117 having a member urged toward closed position. It will be seen that when the plunger 26 is engaged by the dog 28 as shown in Fig. 1a, the member 115 will be held seated and fluid entering through the port 113 will flow to the cylinder 16 through the valve 117. After the cam 28 disengages the plunger 26, fluid may flow to or from the cylinder through the passage controlled by the valve member 115.

The opposite ends 30 and 31 of the valve member 22 constitute pistons to either one of which pressure fluid may be supplied through pipes 32 and 33 arranged to be connected to the line 20 by selective operation of a rotary element 34 of a valve 35. With the element positioned as shown in Fig. 4, pressure is applied to the piston 30 and the pipe 33 is connected to the drain pipe. By turning the element 34 through a quarter revolution, the cylinder of the piston 31 will be connected to the line 20 causing the valve member 22 to be shifted to the left thereby initiating retraction of the head 11.

In the present instance, shifting of the valve element to reverse the valve 21 results from energization of a solenoid 36, the armature 37 of which carries a yieldable pawl 38 adapted to engage a lug 39 rigid with a shaft 40 by which the element 34 is oscillated. When the solenoid is deenergized, the armature is retracted by a spring 41 and the pawl 38 engaged behind the lug 39. Then upon energization of the solenoid, the valve element 34 is swung through ninety degrees in a clockwise direction to the position shown in Fig. 4, the pawl 38 riding over the lug 39. This movement of the valve element shifts the valve member 22 to apply fluid to the upper end of the cylinder 16 thereby initiating forward feed of the head. After the tools have bored the cylinders, a dog 42 on the head engages an arm 43 and in the continued movement of the head reverses the position of the valve element 34 which acts through the medium of the valve 21 to apply the pressure fluid to the lower end of the cylinder 16. Owing to the smaller piston area then effective, the constant supply of fluid from the pump causes the head to be retracted at a rapid reverse return until the valve 27 is closed by the lug 28.

The blocks to be bored are arranged in end to end relation along an elongated track extending transversely of the tool axes through the fixture frame 44 and defined by the fixture skid plates 6 and extensions thereof, the blocks being guided against lateral twisting by a center rail 45 engaging in the crank shaft bearing recesses 46 of the block. To advance the row of blocks along the track and thereby move a finished block out and bring the next block approximately into the operating position, an elongated bar 47 is mounted for endwise movement in a slideway formed in the fixture base 7 below and intermediate the sides of the block slideway. Pivoted at 48 on the bar are a plurality of pawls 49 tending by virtue of the weight of their long ends to swing against pins 50 and thereby raise the short ends into positions to engage the rear end wall of the blocks as the bar is moved forwardly, that is, to the right as viewed in Fig. 2. In the return stroke of the bar 47, the short end of each pawl is depressed and passes beneath the block previously advanced thereby. The pawls are spaced apart distances greater than the length of the block.

To actuate the conveyor bar 47, the rear end is connected by a bracket 51 to the rod 52 of a piston 53 reciprocable in a cylinder 54 mounted in the fixture base 7 beneath the block trackway. The admission of pressure fluid to opposite ends of the cylinder 54 is controlled by a valve 55 having a member 56 and shiftable into two extreme positions and an intermediate neutral position. In the position shown in Fig. 4, pipes 57 and 58 are connected thereby establishing communication between the supply line 20 and the inlet 59 which causes the piston 53 and the bar 47 to be retracted. When the valve member is shifted to the position shown in Fig. 3, the pipe 57 is connected to a pipe 60 and fluid will be admitted to the cylinder 54 through an inlet 61, the piston 53 moving the conveyor bar through its active stroke, this movement being interrupted when a boss 62 on the piston engages the end of the cylinder. When this occurs, the next block to be machined will have reached the operating position. In the neutral position of the valve member 56, both inlets from the pipe 57 will be closed, the supply and drain pipes 20 and 24 being then connected through a passage 63 extending longitudinally of the member 56.

As a means for effecting final accurate location of the block to be bored or detecting the presence of a block in correct position, retractable dowel pins 64 are arranged to be projected upwardly from the surface of the skids 6 and enter holes 65 usually formed in the crank case flange of the block. For this purpose, the pins are rigid with the upper ends of vertically reciprocable plungers 66 mounted in the fixture base 7 and arranged to be raised and lowered by arms 67 on a rock shaft 68 geared to a shaft 69 which may be oscillated by swinging a hand lever 70. The cylindrical portions of the pins 64 fit snugly in the holes 65 and their upper ends are tapered so as to enter the doweled holes even though the latter are not in exact alinement with the pins. Thus, if the block is not located exactly in the proper operating position, the tapered surfaces of the pins will act as cams and shift the block laterally along the skids until the pins have properly entered the dowel holes.

Hydraulically actuated clamping means is provided to press and hold the correctly positioned block against the skid plates 6 during operation of the tools thereon. This means comprises two spaced clamping shoes 71 pivotally supported by pins 72 mounted to slide vertically in the upper portion of the fixture frame 44. Projecting transversely of the pins 72 are slides 73 having cam surfaces 74 which, upon endwise movement of the slides in opposite directions, shift the shoes vertically. Each slide is joined through a lost motion connection 75 to a rod 76 rigid with a piston 77 within a short cylinder 78 having its opposite ends connected to the pipes 58 and 60 so that the valve 55 is utilized to control the clamp actuators. The lost motion in the connection 75 allows the pistons 77 to accumulate sufficient momentum to apply a hammer blow to the slides 73 thereby overcoming any tendency of these to remain lodged in clamped position.

As above set forth, the invention contemplates unclamping of the work prior to actuation of the conveyor bar to move the finished piece out of operating position. To this end, a valve 79 is interposed between the pipe 60 and the cylinder inlet 61, a spring 80 acting on the valve member 81 to prevent the flow of pressure fluid through the inlet 61 until a predetermined back pressure has been built up in the pipe 60. Flow of fluid out of the cylinder through the inlet 61 is permitted by a valve member 82 normally seated in the member 81 but movable upon a flow of fluid from the cylinder to a position opposite a passageway 83. Thus, when the valve 55 is operated to connect the supply pipe 57 and the pipe 60, the fluid available is first supplied to the cylinder 78 thereby actuating the clamp slides in a direction to unclamp the work. After the movements of the pistons 77 have been arrested, the pressure in the pipe 60 builds up until the spring 80 is finally overcome allowing the valve member 81 to move to open position. The ensuing flow of fluid through the inlet 61 moves the piston 53 to advance the conveyor bar 47 in its active stroke. A similarly constructed spring loaded valve 84 is interposed between the pipe 58 and the inlet 59 of the cylinder 54 and operates in a manner similar to the valve 79 to cause the pistons 73 to be actuated and the work to be clamped before fluid is admitted to the cylinder 54 to retract the bar 47.

The proper entry of the pins 64 into the dowel recesses is utilized to indicate correct positioning of the block, this being a condition precedent to effective operation of the work clamping mechanism. For this purpose, the member 56 of the valve 55 is arranged to be operated in the continued movement of the hand lever 70 following entry of the cylindrical portions of the dowel pins in the dowel holes of the block. Herein, the projecting end 85 is urged by a spring 86 into engagement with a cam 87 fast on the shaft 69 and having surfaces 88 and 89 which are so located as to engage the follower 85 when the dowel pins are in their raised and lowered positions respectively. When the follower 85 engages an intermediate surface 87a on the cam 87, the valve member 56 is held in neutral position, both outlets 58 and 60 being then closed. With this arrangement, the surface 88 cannot operate the valve 55 and initiate clamping of the work until the lever 70 has been moved a distance sufficient to project the dowel pins fully into the dowel recesses, so that there is no danger of the clamping forces being applied to the block until the latter has been positioned correctly as determined by the dowel pins. Any danger of injury to the latter by the power actuated clamping mechanism is thus avoided.

In order to bring the surface 89 into engagement with the follower 85, it is first necessary to swing the lever 70 backwardly and thereby retract the dowel pins below the surfaces of the skids 6 before the pressure fluid is applied to the cylinders 54 and 78. Starting of the conveyor bar 47 prior to the time when the finished block is freed for movement is thus avoided, and since the clamping shoes must be released as a condition precedent to the flow of fluid into the cylinder 54 through the inlet 61, the block must be freed completely before the active operation of the work piece conveyor occurs.

Advance of the tools 9 into engagement with the work piece is conditioned not only upon correct positioning of the latter in the fixture but also upon clamping thereof. In the present instance, this is accomplished by extending the energizing circuit for the solenoid 36 through a conductor 90 and a conductor 91 having interposed therein a switch 92 which is operated in response to a building up of the pressure in the pipe 58 following movement of the pistons 77 to clamp the work piece. For this purpose, the movable terminal of the switch is carried by a piston 93 urged by a spring 94 in a direction to open the switch and movable in a cylinder 95 communicating with the pipe 58 through a valve 96 of the same construction as the valves 79 and 84. Thus, the valve member 97 is maintained in closed position by a spring 98 until the pressure in the pipe 58 is greater than that required to operate the clamping piston 77. In this way closure of the switch 92 and advance of the head 11 are prevented until the work piece is properly clamped.

In the present instance, means is provided for disabling the head feeding actuator and thereby preventing forward advance of the head until the block to be bored is resting properly on the skid plates 6 and a block is in a position such that the dowel pins 64 cannot be raised without entering the holes 65 or engaging that portion of the crank case flange in which the dowel holes are bored. This means comprises a spring closed switch 99 and a spring opened switch 100 both interposed in the conductor 91 in series with the switch 92. The movable contact of the switch 100 is connected to an arm 101 positioned in the path of movement of the blocks along the slideway and located in a position such that the arm will be engaged by the block and the switch 100 closed when the block has been moved toward working position a distance sufficient to aline the holes 65 or the surrounding portions of the block with the pins 64. The arm 100 is adapted to yield sufficiently to permit the block to slide thereover while being removed from the machine.

The switch 99 is maintained closed by its spring so long as the block in working position rests properly on the skid plates 6. But if the block is raised slightly from the plates which might be occasioned by engagement of the dowel pins with the surface of the crank case flange when the lever 70 is actuated to raise the dowel pins, an arm 102 is engaged by the upper surface of the block and swung upwardly thereby opening the switch 99 so as to prevent energization of the starting solenoid 36.

To prevent unintentional unclamping of the work, retraction of the dowels or advance of the conveyor bar 47 while the tools are still in engagement with the work, means is provided for locking the handle 70 against movement until the heads 11 are fully retracted. This means comprises a lever 103 pivoted at 104 on the machine frame and urged by a spring 105 into engagement with a disk 106 on the shaft 69. When the lever 70 is swung into the position shown in Fig. 4 to clamp the work and initiate advance of the heads, a notch in the disk 106 is positioned to receive a lug 107 on the lever 103 thereby locking the shaft 69 against movement. Mounted on the head 11 is a dog 108 which in the fully retracted position of the head with the tools out of engagement with the work engages the upper end 109 of the lever 103 swinging the latter in a direction to withdraw the lug 107 out of the notch in the disk 106. With the lug thus retracted, the lever 70 may be swung backwardly to effect unclamping of the work and retraction of the dowels.

Actuating and control mechanism similar to that above described is of course provided for the other of the tool heads. But since the double tool head arrangement forms no part of the present invention, further description is unnecessary.

Operation

Assuming that the tool heads are being advanced into the work, the operating and control parts will be positioned as shown in Fig. 4. Forward advance of the head continues until the dog 42 engages the arm 43 and reverses the position of the control valve element 34 whereupon the heads will be retracted and the tools withdrawn from the work at rapid traverse speed. Movement of the heads is arrested when the dog 28 becomes effective to close the valve 27. In this position of the head, the dog 108 acting on the lever 103 will hold the lug 107 out of engagement with the disk 106. Then the operator swings the hand lever 70 from the position shown in Fig. 4 to that shown in Fig. 3. In the initial part of this movement, that is, while the valve member 56 is moved to and held in neutral position by engagement of the follower 85 with the cam surface 87ª, the dowel pins 64 are retracted out of engagement with the finished block. In the final movement the cam surface 89 is presented to the follower 85 thereby permitting the valve member 56 to be shifted by the spring 86 to a position connecting the pipe 57 and the pipe 60. Pressure fluid is thus admitted to the cylinders 78 causing the pistons 77 to be moved in a direction to retract the slides 73 and unclamp the work. Then as the pressure builds up in the pipe 58, the valve 79 is opened admitting fluid to the cylinder 54 through the inlet 66 whereupon an active stroke of the conveyor bar 47 is initiated, the finished block being at this time free for movement out of the machine. During this movement, the valves 84 and 96 permit fluid to flow out of the cylinders 54 and 95, the switch 92 being thereby opened and the solenoid 36 deenergized.

The machine is thus conditioned for starting of a new cycle which is initiated by movement of the levers 70 to the position shown in Fig. 4. In the initial part of this movement, that is, during engagement of the follower 85 and the cam surface 87ª, the dowel pins 64 are raised, and if they enter correctly in the holes 65, the switches 99 and 100 will remain closed and the lever 70 will be permitted to move a distance sufficient to present the surface 88 to the follower 85 thereby shifting the valve member 56. This connects the pipe 57 to the pipe 58 thereby applying pressure fluid to the cylinders 78 resulting in movement of the pistons 77 to clamp the work. After clamping, the pressure in the line 58 builds up to a value sufficient to open the valves 84 and 96 resulting in closure of the switch 92 and the flow of fluid through the inlet 69 which initiates retraction of the conveyor bar 47. Closure of the switch 92 completes the energizing circuit for the solenoid 36 whereupon the valve element 34 is moved to a position to shift the valve member 10 22 and cause pressure fluid to be delivered to the cylinder 16 through the pipe 23. Advance of the tool head 11 is thus initiated leaving the parts positioned as shown in Fig. 4 with the hand lever 70 locked against movement.

I claim as my invention:

1. A machine tool organization comprising, in combination, a work support providing a slideway along which work pieces may be advanced successively through a predetermined operating position, a head mounted for movement toward and away from a work piece in said position and carrying a tool for operating upon the work, means by which a work piece may be clamped in said position, a member reciprocable longitudinally of the slideway and adapted during its active stroke to move one work piece out of said position and advance the next work piece approximately into said position, individual power actuators for said head, said clamping means and said member, a means movable into engagement with a work piece in said position to locate the work piece accurately on said support, a manually operable control handle operable upon movement in one direction to project said locating means into engagement with a work piece and thereafter initiate the operation of said actuators whereby to clamp the work, retract said member, and cause said head to be advanced into and then out of the work, said handle operating upon reverse movement first to retract said locating means out of engagement with the work and initiate operation of one actuator to unclamp the work, and thereafter initiate an active stroke of said member, and means responsive to the movement of said tool head for disabling said handle against reverse movement until said tool has been withdrawn from the work.

2. A machine tool organization comprising, in combination, a work support providing a slideway along which work pieces may be advanced successively through a predetermined operating position, a head mounted for movement toward and away from a work piece in said position and carrying a tool for operating upon the work, means by which a work piece may be clamped in said position, a member reciprocable longitudinally of said slideway and adapted during its active stroke to move one work piece out of said position and advance the next work piece approximately into said position, individual power actuators for said clamping means and said member, means movable into engagement with a work piece in said position to locate the work piece accurately on said support, and a manually operable control handle operable upon movement in one direction to project said locating means into engagement with a work piece and then to initiate the operation of said actuators whereby to clamp the work and retract said member, said handle operating upon reverse movement first to retract said locating means out of engagement with the work and then to initate operation of said actuators to unclamp the work and initiate an active stroke of said member.

3. A machine tool organization comprising, in combination, a work support, power actuated work-clamping means, power actuated work-conveying means operable to advance successive work pieces into a predetermined position on said support, a power actuated tool head movable into and out of engagement with a work piece in said position to perform a metal-removing operation thereon, a feeler movable into engagement with a work piece in said position to detect correct positioning thereof, a manually operable control element shiftable in opposite directions to move said feeler into and out of engagement with a work piece in said position, and control mechanism operable in the movement of said control element following movement of said feeler into complete engagement with the work piece to initiate operation of said clamping means followed by movement of said tool head into the work and then out of the work, said mechanism operating upon movement of said control element following retraction of said feeler from the work piece to cause unclamping of the work and initiate the operation of said work conveying means, and means operating to disable said control element against said reverse movement while the tool on said head is in engagement with a work piece.

4. A machine tool organization comprising, in combination, a work support, power actuated work-clamping means, power actuated work-conveying means operable to advance successive work pieces into a predetermined position on said support, a power actuated tool head movable into and out of engagement with a work piece in said position to perform a metal-removing operation thereon, a feeler movable into engagement with a work piece in said position to detect correct positioning thereof, a manually operable control element shiftable in opposite directions to move said feeler into and out of engagement with a work piece in said position, and control mechanism operable in the movement of said control element following movement of said feeler into complete engagement with the work piece to initiate operation of said clamping means, said mechanism operating upon movement of said control element following retraction of said feeler from the work piece to cause unclamping of the work and initiate the operation of said work-conveying means, and means operating to disable said control element against said reverse movement while the tool on said head is in engagement with a work piece.

5. A machine tool organization comprising, in combination, a work support, power actuated means for clamping a work piece in a predetermined position on said support, and holding the work piece stationary during machining thereof, means by which work pieces may be advanced successively into said position, a member arranged to be projected into engagement with an improperly positioned work piece on said support and when so projected to shift the work piece and locate the work piece accurately on said support independently of said clamping means, a power operated head movable toward and away from a work piece on said support and carrying a tool for performing a metal-removing operation on the work piece in the advance of the head, a control element for actuating said member, mechanism actuated by said element following positioning of a work piece thereby to initiate operation of said work clamping means, and means operating as an incident to clamping of the work to initiate the advance of said head.

6. A machine tool organization comprising, in combination, a work support, power actuated means for clamping a work piece in a predetermined position on said support and holding the work piece stationary thereon during machining thereof, means by which work pieces may be advanced successively into said position, a feeler arranged to be projected into engagement with a work piece in said position and positively resisted by an improperly positioned work piece so as to detect inaccurate location thereof, a power operated head movable toward and away from a work piece on said support and carrying a tool for performing a metal-removing operation on the work piece in the advance of the head, a control element for actuating said feeler, and mechanism actuated during movement of said feeler and final location of the work thereby to initiate operation of said work clamping means.

7. A machine tool organization comprising, in combination, a work support, power actuated means for clamping a work piece in a predetermined position on said support and holding the work piece stationary thereon during machining thereof, a head movable toward and away from the work piece and carrying a tool for performing a metal-removing operation thereon, a manually operable control element, mechanism actuated by said element in moving in one direction to initiate operation of said work clamping means to clamp the work piece and upon movement of the element in reverse direction to unclamp the work piece, means adapted to detect the presence of a work piece in a predetermined position on said support and operating to block said element against said first mentioned motion until the work piece has been so positioned, means operating as an incident to effective clamping of said work piece to initiate a cycle of forward and return movements of said head, and means operable to disable said element against movement in said reverse direction while said tool is in engaging relation with respect to the work piece.

8. A machine tool comprising, in combination, a work support, a head movable toward and away from said support and carrying a tool adapted to perform a metal-removing operation upon a work piece on said support, power actuated work clamping means for holding the work piece stationary in said support during machining thereof, power actuated work conveying means operable in successive cycles to advance successive work pieces into approximate operative position on said support, a dowel pin mounted for movement into engagement with a work piece on said support to effect final accurate location of the work piece when the latter is improperly positioned on said support, a manually operable member movable in one direction to retract said dowel pin out of engagement with the work and cause unclamping of the work piece, and mechanism actuated by said member after retraction of said dowel pin and unclamping of the work to initiate operation of said conveying mechanism for ejecting the finished work piece and advancing a new work piece into said position.

9. A machine tool comprising, in combination, a work support, a head movable toward and away from said support and carrying a tool adapted to perform a metal-removing operation upon a work piece on said support, power actuated work clamping means, power actuated work conveying means operable in successive cycles to advance successive work pieces into operative position on said support, a dowel pin mounted for movement into engagement with an improperly positioned work piece on said support to effect final accurate positioning of the latter relative to the support, a manually operable member movable in one direction to retract said dowel pin out of engagement with the work and cause unclamping of the work piece, mechanism actuated by said member after retraction of said dowel pin and unclamping of the work to initiate operation of said conveying mechanism for advancing a new work piece into said position, and means operating to disable said member against active movement while said tool is in engaging relation with respect to a work piece on said support.

10. A machine tool comprising, in combination, a work support, means for clamping a work piece on said support, a tool head movable into and out of engagement with a work piece on said support to perform a metal-removing operation thereon, power actuated mechanism for advancing successive work pieces into operating position on said support, individual power actuators for said clamping means, said tool head and said conveying mechanism, a single manually operable device by which the operations of said actuators are controlled, and means operable to detect the presence of a work piece on said support in approximate operating position, and means to detect accurate location of the work piece in final accurately located working position thereon, said two last mentioned means cooperating to disable said control device except when a work piece is in said final position.

11. In a machine tool, the combination of a movable tool support, a work support along which a work piece may be moved into and out of operative relation with respect to said tool support, power actuated mechanism for feeding said tool support toward a work piece on said support, dowel pins on said work support movable into dowel holes on said work piece when the latter is disposed in a predetermined operating position, means to disable said mechanism until said pins have been projected a predetermined distance toward said work piece, and means operating to detect the presence of a work piece in approximate working position and within the operating range of said dowel pins and acting to disable said mechanism when the work piece is positioned to permit free movement of the dowel pins without engagement with the work piece or entry in said holes.

12. In a machine tool, the combination of a movable tool support, a work support along which a work piece may be moved into and out of operative relation with respect to said tool support, power actuated means for transferring work pieces along said work support to present the same opposite said tool support, power actuated mechanism for feeding said tool support toward a work piece on said work support, a member movable into engagement with a work piece located approximately in working position on said work support and operating upon such movement to effect final accurate positioning of the work piece, means conditioned upon the positioning movement of said member to initiate operation of said mechanism, and means separate from and operating independently of the position of said work transferring means to disable said mechanism against effective operation until a work piece has been moved into engageable relation with respect to said member.

13. A machine tool having, in combination, a work support, power actuated means for clamping a work piece on said support, power actuated means for conveying work pieces successively into approximate operating position on said support, a feeler member movable into and out of engagement with a work piece on said support to detect and assist in producing final accurate location of the work piece in a predetermined operating position, and a single manually operable control device for effecting actuation of said feeler and controlling the operation of said clamping means and conveying means.

14. A machine tool having, in combination, two abutments between which a work piece may be held while being machined, one of said abutments being movable, power operated means operable selectively to clamp the work piece against the other abutment and to release the same therefrom, a reciprocable conveyor member adapted during its active strokes in one direction to advance successive work pieces approximately into final working position between said abutments, power actuated mechanism for reciprocating said member, a feeler engageable with an improperly positioned work piece between said abutments to effect final accurate positioning thereof, means responsive to the positioning movement of said feeler to initiate operation of said clamping means, a tool for operating upon the clamped work piece, power actuated mechanism for effecting relative movement between the tool and the work to bring the two into engaging relation, means operating automatically as an incident to clamping of the work piece between said abutments to immediately initiate operation of said last mentioned mechanism, and means operating automatically as an incident to clamping of the work piece between said abutments to initiate operation of said conveyor mechanism and cause said member to be retracted while said tool head advancing mechanism is operating.

15. A machine tool having, in combination, a work support, power actuated mechanism for clamping a work piece on said support, a power actuated tool carrying head movable toward and away from a clamped work piece to effect machining thereof, feeler means movable into engagement with a work piece after approximate positioning of the latter on said support to effect final accurate location of the work piece relative to the support, manually controllable member for effecting actuation of said feeler means, means responsive to the movement of said feeler means for controlling the operation of said clamping mechanism, and positively acting means responsive to the movements of said tool head to disable said feeler means against retraction out of active work-engaging position while the tools on the head are positioned to interfere with the movement of the work piece relative to said support.

16. A machine tool having, in combination, a work support, power actuated mechanism for clamping a work piece on said support, power actuated mechanism for moving a work piece off from said support after machining thereof, dowel means movable into and out of engagement with an approximately positioned work piece on said work support to effect accurate location of the work piece in final operating position, manually controllable means for effecting movement of said dowel means, means responsive to the movement of said feeler means to initiate operation of said clamping mechanism only after said dowel means has moved into active engagement with the work piece and effected final positioning the same relative to said support, and means controlling said other mechanism to initiate active operation thereof only after retraction of said dowel means out of interfering relation with respect to the work piece.

17. A machine tool having, in combination, a work support, a tool head movable relative to said support to machine a work piece in final operating position on said support, power actuated work clamping mechanism, a feeler movable relative to said work support to detect the presence of a work piece in accurately located final position thereon, means controlled by the movements of said feeler to initiate automatic operation of said mechanism to clamp the work piece, a second feeler to detect the presence of a work piece positioned on said support within the operating range of said first mentioned feeler, and means controlled jointly by said clamping mechanism and said second feeler to initiate advance of said tool head in response to effective clamping of a work piece in said final position.

18. A machine tool having, in combination, a work support, power actuated mechanism for clamping a work piece on said support and holding the same stationary thereon during machining, a tool head movable relative to said support to effect machining of the clamped work piece, dowel means independent of said clamping mechanism movable into active engagement with a work piece approximately positioned on said support to effect final accurate positioning of the work piece relative to the support, manually controllable means to actuate said dowel means, and means responsive to the final work positioning movement of said dowel means to initiate operation of said clamping mechanism and thereafter initiate immediate advance of said tool head.

19. A machine tool organization comprising in combination a work support, power actuated means for clamping a work piece in a predetermined position on said support and holding the work piece stationary thereon during machining of the work piece, a member engageable with an improperly positioned work piece on said support during relative movement between the support and the member and operable in such movement to effect final accurate positioning of the work piece relative to the support, a tool, power actuated mechanism for effecting relative movement between the work support and the tool for performing a machining operation on the work piece, means responsive to said final positioning of the work piece to initiate operation of said clamping means to clamp the work piece on said support, and means responsive to the application of a predetermined clamping pressure to said work piece to initiate operation of said mechanism and thereby initiate machining of the work piece.

20. A machine tool having, in combination, an abutment against which a work piece may be held while being machined, a movable abutment, power operated means for actuating said movable abutment toward said first abutment, a tool for operating upon a work piece clamped between said abutments, power actuated mechanism for effecting relative movement between the tool and the work piece to bring the tool into engagement with the work piece for machining the latter, a device adapted to detect the application of a predetermined clamping pressure to the work piece by the movable abutment, a feeler device engageable with the work piece and responsive to movement of the work piece to a predetermined position laterally of the direction in which the clamping force is applied, and means controlled by the joint action of said two devices to initiate automatic operation of said mechanism following effective clamping of the work piece in working position.

ARTHUR H. LYON.